(12) United States Patent
Kreitzer

(10) Patent No.: US 6,169,636 B1
(45) Date of Patent: Jan. 2, 2001

(54) FOCUS CORRECTOR FOR ZOOM PROJECTION LENSES USED WITH PIXELIZED PANELS

(75) Inventor: Melvyn H. Kreitzer, Cincinnati, OH (US)

(73) Assignee: U.S. Precision Lens Incorporated, Cincinnati, OH (US)

(*) Notice: Under 35 U.S.C. 154(b), the term of this patent shall be extended for 0 days.

(21) Appl. No.: 09/383,778

(22) Filed: Aug. 26, 1999

Related U.S. Application Data

(63) Continuation-in-part of application No. 09/304,693, filed on May 4, 1999.

(51) Int. Cl.[7] .................................................. G02B 15/14
(52) U.S. Cl. ........................... 359/691; 359/684; 359/689
(58) Field of Search .................................... 359/691, 651, 359/650, 649, 689, 684

(56) References Cited

U.S. PATENT DOCUMENTS

| | | | |
|---|---|---|---|
| 5,313,330 | 5/1994 | Betensky | 359/676 |
| 5,625,495 | 4/1997 | Moskovich | 359/663 |
| 5,715,097 | * 2/1998 | Shibayama et al. | 359/691 |
| 5,745,297 | * 4/1998 | Kaneko et al. | 359/651 |
| 5,841,587 | 11/1998 | Moskovich | 359/662 |
| 5,900,987 | 5/1999 | Kreitzer | 359/649 |
| 5,917,663 | * 6/1999 | Suzuki | 359/749 |
| 5,969,874 | 10/1999 | Moskovich | 359/651 |

FOREIGN PATENT DOCUMENTS

| | | |
|---|---|---|
| 809 407 | 11/1997 | (EP) . |
| 825 474 | 2/1998 | (EP) . |
| WO99/08138 | 2/1999 | (WO) . |

* cited by examiner

*Primary Examiner*—Georgia Epps
*Assistant Examiner*—Tim Thompson
(74) *Attorney, Agent, or Firm*—Maurice M. Klee

(57) ABSTRACT

A zoom projection lens for use with pixelized panels is provided. The projection lens has a negative/positive (retrofocus) form, with the positive lens unit (U2) having two positive subunits ($U2_{S1}$, $U2_{S2}$). The image (screen) side subunit ($U2_{S1}$) serves as focus corrector for the lens, i.e., after zooming, this subunit is moved to adjust the focus of the lens. Compared to moving the negative unit (U1), this approach achieves better aberration correction and involves moving less mass through smaller distances.

10 Claims, 2 Drawing Sheets

FOCUS CORRECTOR FOR ZOOM PROJECTION LENSES USED WITH PIXELIZED PANELS

CROSS REFERENCE TO RELATED APPLICATION

This application is a continuation-in-part of pending U.S. application Ser. No. 09/304,693, filed May 4, 1999, and entitled "Projection Lenses Having Reduced Lateral Color for Use with Pixelized Panels," the content of which in its entirety is incorporated herein by reference.

FIELD OF THE INVENTION

This invention relates to projection lenses and, in particular, to zoom projection lenses which can be used, inter alia, to form an image of an object composed of pixels, e.g., an LCD, a reflective LCD, a DMD, or the like.

DEFINITIONS

As used in this specification, the following terms shall have the following meanings:

(1) Telecentric

Telecentric lenses are lenses which have at least one pupil at infinity. In terms of principal rays, having a pupil at infinity means that the principal rays are parallel to the optical axis (a) in object space, if the entrance pupil is at infinity, or (b) in image space, if the exit pupil is at infinity. Since light can propagate through a lens in either direction, the pupil at infinity can serve as either an entrance or an exit pupil depending upon the lens' orientation with respect to the object and the image. Accordingly, the term "telecentric pupil" will be used herein to describe the lens' pupil at infinity, whether that pupil is functioning as an entrance or an exit pupil.

In practical applications, the telecentric pupil need not actually be at infinity since a lens having an entrance or exit pupil at a sufficiently large distance from the lens' optical surfaces will in essence operate as a telecentric system. The principal rays for such a lens will be substantially parallel to the optical axis and thus the lens will in general be functionally equivalent to a lens for which the theoretical (Gaussian) location of the pupil is at infinity.

Accordingly, as used herein, the terms "telecentric" and "telecentric lens" are intended to include lenses which have at least one pupil at a long distance from the lens' elements, and the term "telecentric pupil" is used to describe such a pupil at a long distance from the lens' elements. For the projection lenses of the invention, the telecentric pupil distance will in general be at least about 10 times the lens' focal length.

(2) Pseudo-Aperture Stop

The term "pseudo-aperture stop" is used herein in the same manner as it is used in commonly-assigned U.S. Pat. No. 5,313,330 to Ellis Betensky, the contents of which are incorporated herein by reference.

BACKGROUND OF THE INVENTION

Projection lens systems (also referred to herein as "projection systems") are used to form an image of an object on a viewing screen. Such systems can be of the front projection or rear projection type, depending on whether the viewer and the object are on the same side of the screen (front projection) or on opposite sides of the screen (rear projection).

The basic structure of such a system is shown in FIG. 2, where 10 is a light source (e.g., a tungsten-halogen lamp), 12 is illumination optics which forms an image of the light source (hereinafter referred to as the "output" of the illumination system), 14 is the object which is to be projected (e.g., an LCD matrix of on and off pixels), and 13 is a projection lens, composed of multiple lens elements, which forms an enlarged image of object 14 on viewing screen 16. The system can also include a field lens unit, e.g., a Fresnel lens, in the vicinity of the pixelized panel to appropriately locate the exit pupil of the illumination system.

For front projection systems, the viewer will be on the left side of screen 16 in FIG. 2, while for rear projection systems, the viewer will be on the right side of the screen. For rear projection systems which are to be housed in a single cabinet, a mirror is often used to fold the optical path and thus reduce the system's overall size.

Projection lens systems in which the object is a pixelized panel are used in a variety of applications. Such systems preferably employ a single projection lens which forms an image of, for example, a single panel having red, green, and blue pixels. In some cases, e.g., large image rear projection systems, multiple panels and multiple projection lenses are used, with each panel/projection lens combination producing a portion of the overall image. In either case, projection lenses used with such systems generally need to have a relatively long back focal length to accommodate the prisms, beam splitters, color wheels, etc. normally used with pixelized panels.

A particularly important application of projection lens systems employing pixelized panels is in the area of microdisplays, e.g., front projection systems which are used to display data and rear projection systems which are used as computer monitors. Recent breakthroughs in manufacturing technology has led to a rise in popularity of microdisplays employing digital light valve devices such as DMDs, reflective LCDs, and the like.

Projection displays based on these devices offer advantages of small size and light weight. As a result, a whole new class of ultra portable lightweight projectors operating in front-projection mode and employing digital light valves has appeared on the market. Lightweight compact rear-projection systems can also be achieved through the use of these devices.

To display images having a high information content, these devices must have a large number of pixels. Since the devices themselves are small, the individual pixels are small, a typical pixel size ranging from $17\mu$ for DMD displays to approximately $8\mu$ or even less for reflective LCDs. This means that the projection lenses used in these systems must have a very high level of correction of aberrations. Of particular importance is the correction of chromatic aberrations and distortion.

A high level of chromatic aberration correction is important because color aberrations can be easily seen in the image of a pixelized panel as a smudging of a pixel or, in extreme cases, the complete dropping of a pixel from the image. These problems are typically most severe at the edges of the field.

All of the aberrations of the system need to be addressed, with lateral color, chromatic variation of coma, astigmatism, and distortion typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction, including correction of secondary lateral color, is thus needed from the projection lens.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset panels. In such a case, the distortion at the viewing screen does not vary symmetrically about a horizontal line through the center of the screen but can increase monotonically from, for example, the bottom to the top of the screen. This effect makes even a small amount of distortion readily visible to the viewer.

Low distortion and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of distortion or color aberration in the images of such interfaces.

The above-mentioned microdisplays typically require that the light beam from the illumination system has a near-normal angle of incidence upon the display. In terms of the projection lens, this translates into a requirement that the lens has a telecentric entrance pupil, i.e., the projection lens must be telecentric in the direction of its short imaging conjugate where the object (pixelized panel) is located. This makes the lens asymmetric about the stop which makes the correction of lateral color more difficult.

In addition to the foregoing, for rear projection systems, there is an ever increasing demand for smaller cabinet sizes (smaller footprints). In terms of the projection lens, this translates into a requirement that the lens has a wide field of view in the direction of the image (screen). This requirement makes it even more difficult to correct the lateral color of the lens. Similarly, the requirement for a relatively long back focal length also makes it more difficult to correct lateral color.

The ability of a projection lens to operate efficiently over a range of focal lengths is desirable since it allows the projection system to be used with screens of different sizes and halls of different dimensions without the need to change any of the components of the system. The challenge, of course, is to maintain a high level of aberration correction throughout the operative range of focal lengths without unduly complicating the lens design.

SUMMARY OF THE INVENTION

In view of the foregoing, there exists a need in the art for projection lenses for use with pixelized panels which have some and preferably all of the following properties:

(1) a high level of lateral color correction, including correction of secondary lateral color;
(2) low distortion;
(3) a large field of view in the direction of the image;
(4) a telecentric entrance pupil;
(5) a relatively long back focal length; and
(6) the ability to zoom between a maximum effective focal length and a minimum effective focal length.

The above-referenced U.S. application Ser. No. 09/304,693 (the '693 application) discusses in detail various approaches for achieving properties (1) to (5) above. The present application is addressed to a particular approach for achieving property (6). The invention of the present application can be used with pixelized panel projection lenses designed in accordance with the '693 application or with lenses designed in other ways.

To achieve property (6), the invention provides a projection lens for forming an image of an object, said lens having a zoom range between a minimum effective focal length $f_{min}$ and a maximum effective focal length $f_{max}$, said lens consisting in order from its image end (long conjugate or screen end) to its object end (short conjugate or pixelized panel end) of:

(A) a first lens unit U1 having a negative power;
(B) a second lens unit U2 having a positive power, said second lens unit being separated from the first lens unit by a first axial space which is varied during zooming (Space 1 in the Tables 1–3); and
(C) an optional field lens unit;

wherein:
the second lens unit consists in order from its image end to its object end of:
(i) a first lens subunit $U2_{S1}$ having a positive power (the focus corrector);
(ii) a second lens subunit $U2_{S2}$ having a positive power, said second lens subunit being separated from the first lens subunit by a second axial space which is varied during focusing (Space 2 in the Tables 1–3), said second axial space being varied through movement of the first lens subunit.

Preferably, the first lens subunit has less lens elements than the second lens subunit. Most preferably, the first lens subunit is a singlet. Also, the first lens subunit preferably has less optical power than the second lens subunit.

The projection lenses of the invention can be designed using the location of the output of the illumination system as a pseudo-aperture stop/entrance pupil of the projection lens (see the above-referenced Betensky patent). In this way, efficient coupling is achieved between the light output of the illumination system and the projection lens.

Figure 1:
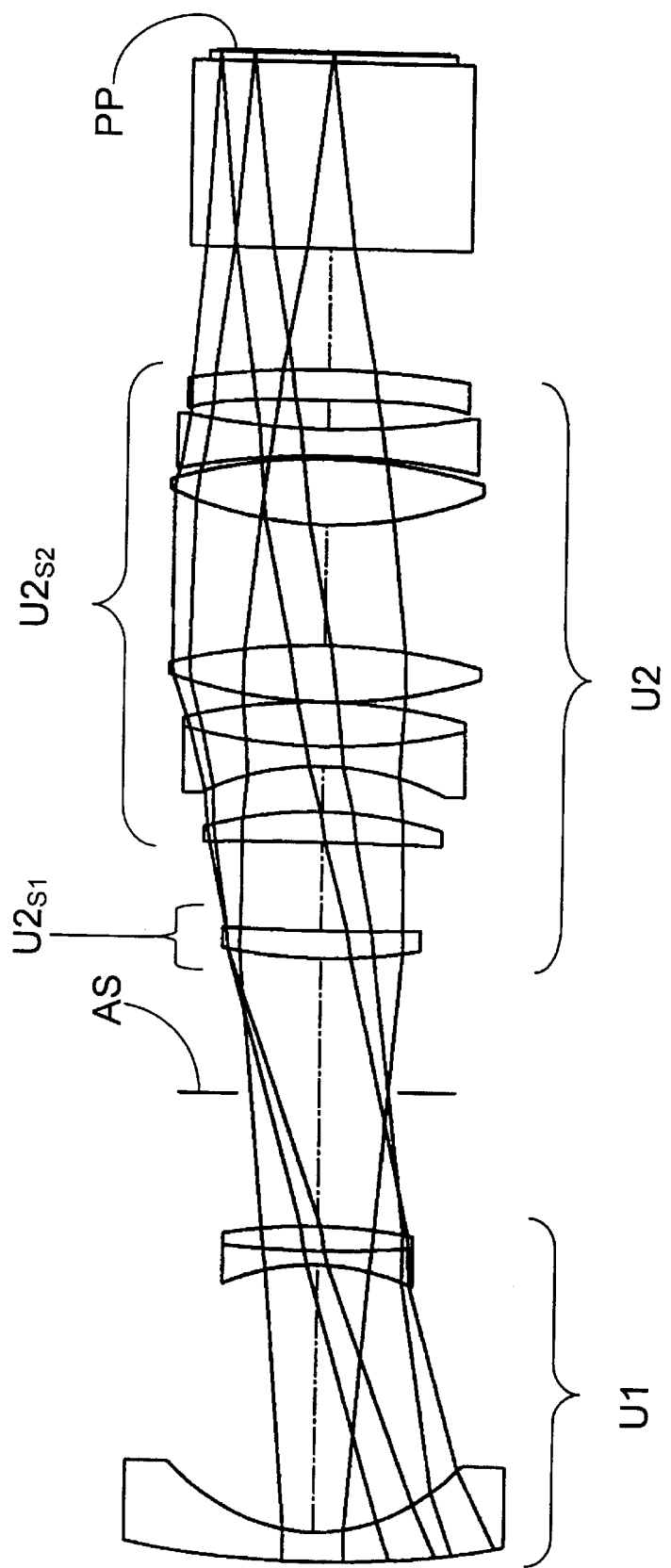
FIG. 1 is a schematic side view of a representative projection lens constructed in accordance with the invention.
Figure 2:
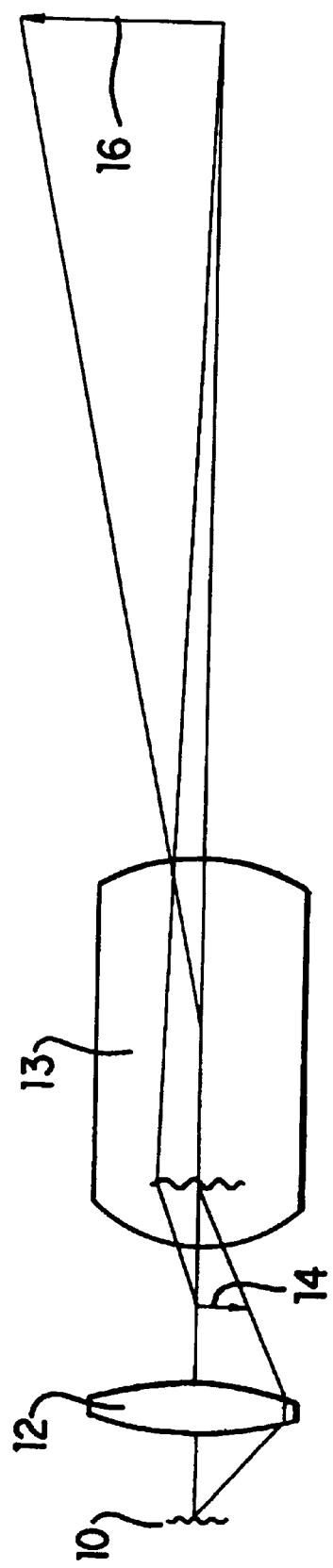
FIG. 2 is a schematic diagram showing an overall projection lens system in which the projection lenses of the present invention can be used.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The projection lenses of the present invention are of the retrofocus or the inverted telephoto type and consist of two lens units, i.e., a negative unit (U1) on the long conjugate side and a positive unit (U2) on the short conjugate side, which are typically separated by an aperture stop or a pseudo-aperture stop.

The use of this overall lens form to produce an image of a pixelized panel has various advantages. Thus, telecentricity is readily achieved by locating the lens' aperture stop or pseudo-aperture stop in the front focal plane of the second positive unit. Additional advantages are a long back focal length and the ability to handle a wide field of view. Both of these characteristics are particularly useful in rear projection systems, where the lens must have a wide field of view to achieve the smallest possible overall package size, and where there is a need to accommodate beam splitting prisms between the lens and the pixelized panel. These prisms may include polarizing beam splitters, as well as color splitting prisms.

The lenses of the invention achieve a high level of distortion correction by using one or more aspherical surfaces in the first lens unit. Some residual distortion, as well as spherical aberration of the lens' entrance pupil, is corrected through the use of one or more aspherical surfaces in the second lens unit. The spherical aberration of the entrance pupil should be minimized to achieve telecentricity for any arbitrary point in the object plane of the lens. Preferably, the aspherical surfaces are formed on plastic lens elements.

The most critical aberration that must be corrected is the lens' lateral color. Various preferred approaches for correcting this aberration are disclosed in the '693 application. As noted above, although preferred, these approaches need not be used in the practice of the present invention.

Zooming of the projection lenses of the invention is achieved by moving the first and second lens units relative to one another. Typically, the units are coupled together mechanically so that both units move together relative to the pixelized panel (see Space 3 in Tables 1–3), and at the same time, the units move relative to one another (see Space 1 in Tables 1–3).

In accordance with the prior art, after such zooming, the focus of the lens would be adjusted by moving the first lens unit, i.e., by a further (second) adjustment of Space 1 in Tables 1–3. In accordance with the present invention, the first lens subunit of the second lens unit is moved for this purpose rather than the first lens unit, i.e., Space 2 in Tables 1–3 is adjusted rather than Space 1.

This approach has a number of advantages. First, the first lens subunit typically has less lens elements, has a smaller diameter (smaller maximum clear aperture), and a shorter length than the first lens unit. Having less elements and a smaller diameter means that the first lens subunit has less mass than the first unit. Accordingly, it is easier to move this lens subunit using, for example, a motorized drive than to move the first lens unit.

Moreover, it was surprisingly found that it was easier to correct the aberrations of the system when focusing was done using the first lens subunit rather than the first lens unit. In part, this is believed to be due to the fact that smaller motions of the first lens subunit are needed to correct focus than would be needed if the first unit were moved. This is an important advantage of the invention since, as discussed above, aberration correction is critical in projection lenses used with pixelized panels.

Conventional mechanisms known in the art, e.g., cam mechanisms and motorized drives, can be used to move the lens and/or its component parts during focusing and zooming.

Without intending to limit it in any manner, the present invention will be more fully described by the following examples.

EXAMPLES

FIG. 1 and Tables 1–3 illustrate representative projection lenses constructed in accordance with the invention. The prescription of Table 1 is preferred.

HOYA designations are used for the various glasses employed in the lens systems. Equivalent glasses made by other manufacturers (e.g., OHARA or SCHOTT) can be used in the practice of the invention. Industry acceptable materials are used for the plastic elements.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–3.

The designation "a" associated with various surfaces in the tables represents an aspherical surface, i.e., a surface for which at least one of D, E, F, G, H, or I in the above equation is not zero; and the designation "c" indicates a surface for which k in the above equation is not zero. The various planar structures located on the short conjugate side of U2 in the figure and tables represent components which are used with or are a part of the pixelized panel. They do not constitute part of the projection lens. All dimensions given in the tables are in millimeters.

The prescription tables are constructed on the assumption that light travels from left to right in the figures. In actual practice, the viewing screen will be on the left and the pixelized panel will be on the right, and light will travel from right to left. In particular, the references in the prescription tables to objects/images and entrance/exit pupils are reversed from that used in the rest of the specification. The pixelized panel is shown in FIG. 1 by the designation "PP" and the equivalent physical aperture stop is shown by the designation "AS".

The zoom projection lenses of the examples were designed using the pseudo-aperture stop/entrance pupil technique of Betensky, U.S. Pat. No. 5,313,330. In accordance with this approach, the illumination system is used to define the entrance pupil for the projection lens, with the entrance pupil being located at a constant position relative to the pixelized panel for all lens focal lengths and conjugates. The location of this pupil is determined by the substantially parallel light (substantially telecentric light) which passes through the pixelized panel from the illumination system. In the examples, the pseudo-aperture stop/entrance pupil is surface 24. The image of this surface by the second lens unit places the equivalent physical aperture stop (AS) between the first and second lens units as illustrated in FIG. 1.

The zoom lens of Table 1 has the following properties at its short focal length position:

maximum half field of view—32.7°;

maximum distortion—1.00%;

lateral color at 0.7 field—11.4 microns;

lateral color at 1.0 field—17.5 microns;

pixel size—28 microns; and $BFL/f_0$—1.5;

where lateral color values were determined from the chromatic blur in the image focal plane for wavelengths in the range from 460 nanometers to 620 nanometers, pixel size is pixel width, BFL is back focal length, and $f_0$ is effective focal length of the lens. The lenses of Tables 2 and 3 have similar properties.

In general, the zoom projection lenses of the invention will have some and preferably all of the following properties:

(i) the lens has a half field of view in the direction of the image of at least 20° and preferably at least 25°;

(ii) the lateral color blur of the lens at its full field for wavelengths in the range from 460 nanometers to 620 nanometers is less than a pixel and preferably less than three-quarters of a pixel (note that the level of lateral color correction can be determined at the object plane or the image plane, a magnified pixel being used when the determination is performed at the image plane);

(iii) the distortion of the lens is less than 1.5 percent and preferably less than or equal to 1.0 percent; and (iv) the ratio of the lens's back focal length (BFL) to its focal length is greater than 0.7, preferably greater than 1.0, and most preferably greater than or equal to 1.5;

where these properties are evaluated at the zoom lens' short focal length position.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 316.4987 | 9.00000 | ACRYLIC | 106.50 |
| 2 | ac | 48.5107 | 79.22000 | | 83.70 |
| 3 | | −68.2336 | 4.10000 | FCD1 | 53.00 |
| 4 | | 290.7899 | 7.00000 | TAF3 | 53.00 |
| 5 | | −157.0756 | Space 1 | | 52.00 |
| 6 | | 154.9494 | 8.14000 | FD60 | 54.20 |
| 7 | | 758.2655 | Space 2 | | 55.40 |
| 8 | | −1067.2049 | 8.92000 | FCD1 | 65.80 |
| 9 | | −119.5453 | 13.48000 | | 67.20 |
| 10 | | −78.2658 | 6.00000 | FD5 | 68.80 |
| 11 | | 158.5274 | 13.50000 | FCD1 | 77.70 |
| 12 | | −158.5274 | 0.10000 | | 79.90 |
| 13 | | 139.1541 | 16.70000 | FCD1 | 88.00 |
| 14 | | −176.7399 | 35.55000 | | 88.60 |
| 15 | | 112.2150 | 19.30000 | FCD1 | 89.00 |
| 16 | | −157.8763 | 0.90000 | | 88.00 |
| 17 | | −217.6579 | 8.00000 | FEL6 | 85.70 |
| 18 | | 217.6579 | 8.72000 | | 80.50 |
| 19 | a | −1204.7930 | 9.00000 | ACRYLIC | 79.90 |
| 20 | | −266.7334 | Space 3 | | 79.70 |
| 21 | | ∞ | 17.00000 | | 80.00 |
| 22 | | ∞ | 55.00000 | BSC7 | 80.00 |
| 23 | | ∞ | 32580.94922 | | 70.00 |
| 24 | | Aper. stop | −32580.94922 | | 12029.19 |
| 25 | | ∞ | 0.00000 | | 70.00 |
| 26 | | ∞ | 2.50000 | BSC7 | 70.00 |
| 27 | | ∞ | Image distance | | 70.00 |

Symbol Description
a - Polynomial asphere
c - Conic section

Even Polynomial Aspheres and Conic Constants

| Surf. No. | k | D | E | F | G | H | I |
|---|---|---|---|---|---|---|---|
| 1 | | −3.7810E − 08 | 3.8833E − 11 | 4.3571E − 15 | −1.0785E − 18 | −3.9211E − 22 | 6.9576E − 26 |
| 2 | −1.2000E + 00 | 4.3607E − 07 | 1.0988E − 10 | −3.6564E − 14 | 2.5559E − 17 | 1.2829E − 20 | −7.5081E − 24 |
| 19 | | −7.7096E − 07 | −5.1172E − 11 | −2.0446E − 14 | 1.5579E − 17 | −2.9214E − 21 | −7.1999E − 25 |

Variable Spaces

| Zoom/Focus Pos. | Space 1 T(5) | Space 2 T(7) | Space 3 T(20) | Focal Shift | Image Distance |
|---|---|---|---|---|---|
| 1 | 78.612 | 26.342 | 19.043 | −0.064 | 0.408 |
| 2 | 40.873 | 26.342 | 30.135 | −0.088 | 0.401 |
| 3 | 7.086 | 26.342 | 44.452 | −0.089 | 0.394 |
| 4 | 78.612 | 27.165 | 18.223 | −0.083 | 0.406 |
| 5 | 7.086 | 27.457 | 43.334 | −0.052 | 0.390 |
| 6 | 78.612 | 25.832 | 19.554 | −0.074 | 0.408 |
| 7 | 7.086 | 25.415 | 45.379 | −0.106 | 0.399 |

POS 1 System First Order Properties

OBJ. HT: −1500.0    f/ 2.81    MAG: −0.0220
STOP: 0.00 after surface 24. DIA: −11789.
EFL: 51.3345    FVD: 446.536    ENP: 68.0696

TABLE 1-continued

| | | |
|---|---|---|
| IMD: 0.408490 | BRL: 446.127 | EXP: 32579.3 |
| OBD: −2265.24 | OVL: 2711.77 | |

POS 2 System First Order Properties

OBJ. HT: −1400.0   f/ 2.81   MAG:   −0.0220
STOP: 0.00 after surface 24.   DIA: −11791.
EFL: 61.1831   FVD: 419.881   ENP: 59.1300
IMD: 0.400794   BRL: 419.480   EXP: 32579.3
OBD: −2721.80   OVL: 3141.68

POS 3 System First Order Properties

OBJ. HT: −1400.0   f/ 2.81   MAG:   −0.0220
STOP: 0.00 after surface 24.   DIA: −11784.
EFL: 73.8712   FVD: 400.404   ENP: 47.6042
IMD: 0.394117   BRL: 400.010   EXP: 32579.3
OBD: −3310.01   OVL: 3710.42

POS 4 System First Order Properties

OBJ. HT: −4800.0   f/ 2.81   MAG:   −0.0064
STOP: 0.00 after surface 24.   DIA: −11788.
EFL: 51.3519   FVD: 446.536   ENP: 68.1940
IMD: 0.405961   BRL: 446.130   EXP: 32579.3
OBD: −7955.46   OVL: 8401.99

POS 5 System First Order Properties

OBJ. HT: −4640.0   f/ 2.81   MAG:   −0.0066
STOP: 0.00 after surface 24.   DIA: −11780.
EFL: 73.7874   FVD: 400.398   ENP: 47.9533
IMD: 0.390076   BRL: 400.008   EXP: 32579.3
OBD: −11131.8   OVL: 11532.2

POS 6 System First Order Properties

OBJ. HT: −960.00   f/ 2.81   MAG:   −0.0321
STOP: 0.00 after surface 24.   DIA: −11790.
EFL: 51.3237   FVD: 446.536   ENP: 67.9925
IMD: 0.408276   BRL: 446.127   EXP: 32579.3
OBD: −1530.80   OVL: 1977.33

POS 7 System First Order Properties

OBJ. HT: −890.00   f/ 2.81   MAG:   −0.0346
STOP: 0.00 after surface 24.   DIA: −11788.
EFL: 73.9411   FVD: 400.409   ENP: 47.3132
IMD: 0.399310   BRL: 400.010   EXP: 32579.3
OBD: −2089.54   OVL: 2489.95

First-Order Data

| Zoom/Focus Position | 1 | 2 | 3 | 4 | 5 | 6 | 7 |
|---|---|---|---|---|---|---|---|
| f/number | 2.81 | 2.81 | 2.81 | 2.81 | 2.81 | 2.81 | 2.81 |
| Magnification | −0.0220 | −0.0220 | −0.0220 | −0.0064 | −0.0066 | −0.0321 | −0.0346 |
| Object Height | −1500.0 | −1400.0 | −1400.0 | −4800.0 | −4640.0 | −960.00 | −890.00 |
| Object Distance | −2265.2 | −2721.8 | −3310.0 | −7955.5 | −11132. | −1530.8 | −2089.5 |
| Effective Focal Length | 51.335 | 61.183 | 73.871 | 51.352 | 73.787 | 51.324 | 73.941 |
| Image Distance | 0.40849 | 0.40079 | 0.39412 | 0.40596 | 0.39008 | 0.40828 | 0.39931 |
| Overall Length | 2711.8 | 3141.7 | 3710.4 | 8402.0 | 11532. | 1977.3 | 2490.0 |
| Forward Vertex Distance | 446.54 | 419.88 | 400.40 | 446.54 | 400.40 | 446.54 | 400.41 |
| Barrel Length | 446.13 | 419.48 | 400.01 | 446.13 | 400.01 | 446.13 | 400.01 |
| Stop Surface Number | 24 | 24 | 24 | 24 | 24 | 24 | 24 |
| Distance to Stop | 0.00 | 0.00 | 0.00 | 0.00 | 0.00 | 0.00 | 0.00 |
| Stop Diameter | −11789.348 | −11791.152 | −11784.277 | −11787.995 | −11780.033 | −11790.147 | −11787.969 |
| Entrance Pupil Distance | 68.070 | 59.130 | 47.604 | 68.194 | 47.953 | 67.993 | 47.313 |
| Exit Pupil Distance | 32579. | 32579. | 32579. | 32579. | 32579. | 32579. | 32579. |

First Order Properties of Elements

| Element Number | Surface Numbers | | Power | f′ |
|---|---|---|---|---|
| 1 | 1 | 2 | −0.84925E − 02 | −117.75 |
| 2 | 3 | 4 | −0.90534E − 02 | −110.46 |
| 3 | 4 | 5 | 0.78703E − 02 | 127.06 |
| 4 | 6 | 7 | 0.41980E − 02 | 238.21 |

TABLE 1-continued

|   |    |    |              |         |
|---|----|----|--------------|---------|
| 5 | 8  | 9  | 0.37141E − 02 | 269.25  |
| 6 | 10 | 11 | −0.13065E − 01 | −76.539 |
| 7 | 11 | 12 | 0.61994E − 02 | 161.31  |
| 8 | 13 | 14 | 0.62897E − 02 | 158.99  |
| 9 | 15 | 16 | 0.74185E − 02 | 134.80  |
| 10 | 17 | 18 | −0.49410E − 02 | −202.39 |
| 11 | 19 | 20 | 0.14407E − 02 | 694.10  |

First−Order Properties of Doublets

| Element Numbers | | Surface Numbers | | Power | f' |
|---|---|---|---|---|---|
| 2 | 3 | 3 | 5 | −0.84544E − 03 | −1182.8 |
| 6 | 7 | 10 | 12 | −0.63038E − 02 | −158.64 |

First Order Properties of Groups

| Group Number | Surface Numbers | | Power | f' |
|---|---|---|---|---|
| 1 | 1 | 5 | −0.95858E − 02 | −104.32 |
| 2 | 6 | 7 | 0.41980E − 02 | 238.21 |
| 3 | 8 | 20 | 0.75751E − 02 | 132.01 |

First Order Properties of the Lens

| Zoom/Focus Position Number | Power | f' |
|---|---|---|
| 1 | 0.19480E − 01 | 51.335 |
| 2 | 0.16344E − 01 | 61.183 |
| 3 | 0.13537E − 01 | 73.871 |
| 4 | 0.19473E − 01 | 51.352 |
| 5 | 0.13552E − 01 | 73.787 |
| 6 | 0.19484E − 01 | 51.324 |
| 7 | 0.13524E − 01 | 73.941 |

TABLE 2

| Surf. No. | Type | Radius | Thickness | Glass | Clear Aperture Diameter |
|---|---|---|---|---|---|
| 1 | a | 256.2114 | 9.00000 | ACRYLIC | 104.16 |
| 2 | ac | 46.6427 | 71.04216 | | 81.05 |
| 3 | | −68.5819 | 4.10000 | FCD1 | 54.77 |
| 4 | | 230.5086 | 8.00000 | TAF3 | 54.54 |
| 5 | | −172.4161 | Space 1 | | 54.45 |
| 6 | | 170.1619 | 8.14000 | FD60 | 50.53 |
| 7 | | 985.0964 | Space 2 | | 51.90 |
| 8 | | −1806.9340 | 12.90000 | FCD1 | 63.83 |
| 9 | | −119.5506 | 12.76572 | | 66.37 |
| 10 | | −78.5134 | 6.00000 | FD5 | 68.04 |
| 11 | | 182.0865 | 13.50000 | FCD1 | 76.59 |
| 12 | | −155.7738 | 0.10000 | | 79.19 |
| 13 | | 143.0293 | 16.40000 | FCD1 | 86.91 |
| 14 | | −185.9051 | 33.71327 | | 87.70 |
| 15 | | 121.7684 | 19.33261 | FCD1 | 89.21 |
| 16 | | −165.2038 | 1.22690 | | 88.11 |
| 17 | | −274.4370 | 9.00000 | FEL6 | 85.52 |
| 18 | | 232.5454 | 8.00000 | | 80.76 |
| 19 | a | −1162.4850 | 11.00000 | ACRYLIC | 80.29 |
| 20 | | −250.2591 | Space 3 | | 80.19 |
| 21 | | ∞ | 17.00000 | | 75.54 |
| 22 | | ∞ | 55.00000 | BSC7 | 72.41 |
| 23 | | ∞ | 32580.94922 | | 65.76 |
| 24 | | Aper. stop | −32580.94922 | | 12022.52 |
| 25 | | ∞ | 0.00000 | | 65.76 |
| 26 | | ∞ | 2.50000 | BSC7 | 65.76 |
| 27 | | ∞ | Image distance | | 65.46 |

Symbol Description
a - Polynomial asphere
c - Conic section

TABLE 2-continued

Even Polynomial Aspheres and Conic Constants

| Surf. No. | k | D | E | F | G | H | I |
|---|---|---|---|---|---|---|---|
| 1 |  | 7.6142E − 08 | 2.1400E − 11 | 3.5721E − 15 | −1.8127E − 19 | −2.7585E − 22 | 4.2049E − 26 |
| 2 | −1.2000E + 00 | 6.9750E − 07 | 1.5171E − 10 | −3.5735E − 14 | 2.2817E − 17 | 1.1872E − 20 | −4.3252E − 24 |
| 19 |  | −7.1999E − 07 | −2.8786E − 11 | −2.5403E − 14 | 1.0105E − 17 | 9.9122E − 22 | −1.2757E − 24 |

Variable Spaces

| Zoom/Focus Pos. | Space 1 T(5) | Space 2 T(7) | Space 3 T(20) | Focal Shift | Image Distance |
|---|---|---|---|---|---|
| 1 | 78.798 | 27.949 | 20.652 | −0.048 | 0.399 |
| 2 | 41.563 | 27.949 | 32.019 | −0.060 | 0.400 |
| 3 | 9.348 | 27.949 | 46.123 | −0.054 | 0.400 |
| 4 | 78.798 | 28.761 | 19.841 | −0.058 | 0.402 |
| 5 | 9.348 | 29.097 | 44.975 | −0.033 | 0.399 |
| 6 | 78.798 | 27.436 | 21.164 | −0.052 | 0.398 |
| 7 | 9.348 | 27.006 | 47.066 | −0.071 | 0.400 |

POS 1 System First Order Properties

OBJ. HT: −1500.0          f/ 2.81 MAG:          −0.0220
STOP: 0.00 after surface 24. DIA: −11785.
EFL: 51.1386          FVD: 446.519          ENP: 67.4777
IMD: 0.399020          BRL: 446.120          EXP: 32579.3
OBD: −2256.93          OVL: 2703.44

POS 2 System First Order Properties

OBJ. HT: −1400.0          f/ 2.81 MAG:          −0.0220
STOP: 0.00 after surface 24. DIA: −11532.
EFL: 61.0036          FVD: 420.651          ENP: 58.7259
IMD: 0.399612          BRL: 420.252          EXP: 32579.3
OBD: −2714.05          OVL: 3134.70

POS 3 System First Order Properties

OBJ. HT: −1400.0          f/ 2.81 MAG:          −0.0220
STOP: 0.00 after surface 24. DIA: −11282.
EFL: 73.2246          FVD: 402.540          ENP: 47.8756
IMD: 0.399977          BRL: 402.140          EXP: 32579.3
OBD: −3280.35          OVL: 3682.89

POS 4 System First Order Properties

OBJ. HT: −4800.0          f/ 2.81 MAG:          −0.0064
STOP: 0.00 after surface 24. DIA: −11784.
EFL: 51.1401          FVD: 446.523          ENP: 67.6082
IMD: 0.401728          BRL: 446.121          EXP: 32579.3
OBD: −7922.95          OVL: 8369.47

POS 5 System First Order Properties

OBJ. HT: −4640.0          f/ 2.81 MAG:          −0.0066
STOP: 0.00 after surface 24. DIA: −11279.
EFL: 73.0988          FVD: 402.538          ENP: 48.2536
IMD: 0.398550          BRL: 402.140          EXP: 32579.3
OBD: −11027.2          OVL: 11429.7

POS 6 System First Order Properties

OBJ. HT: −960.00          f/ 2.81 MAG:          −0.0321
STOP: 0.00 after surface 24. DIA: −11786.
EFL: 51.1377          FVD: 446.518          ENP: 67.3953
IMD: 0.398357          BRL: 446.119          EXP: 32579.3
OBD: −1525.60          OVL: 1972.12

POS 7 System First Order Properties

OBJ. HT: −890.00          f/ 2.93 MAG:          −0.0346
STOP: 0.00 after surface 24. DIA: −11285.
EFL: 73.3284          FVD: 402.541          ENP: 47.5641
IMD: 0.400345          BRL: 402.140          EXP: 32579.3
OBD: −2071.59          OVL: 2474.13

TABLE 2-continued

First–Order Data

| Zoom/Focus Position | 1 | 2 | 3 | 4 | 5 | 6 | 7 |
|---|---|---|---|---|---|---|---|
| f/number | 2.81 | 2.87 | 2.93 | 2.81 | 2.93 | 2.81 | 2.93 |
| Magnification | −0.0220 | −0.0220 | −0.0220 | −0.0064 | −0.0066 | −0.0321 | −0.0346 |
| Object Height | −1500.0 | −1400.0 | −1400.0 | −4800.0 | −4640.0 | −960.00 | −890.00 |
| Object Distance | −2256.9 | −2714.1 | −3280.4 | −7923.0 | −11027. | −1525.6 | −2071.6 |
| Effective Focal Length | 51.139 | 61.004 | 73.225 | 51.140 | 73.099 | 51.138 | 73.328 |
| Image Distance | 0.39902 | 0.39961 | 0.39998 | 0.40173 | 0.39855 | 0.39836 | 0.40034 |
| Overall Length | 2703.4 | 3134.7 | 3682.9 | 8369.5 | 11430. | 1972.1 | 2474.1 |
| Forward Vertex Distance | 446.52 | 420.65 | 402.54 | 446.52 | 402.54 | 446.52 | 402.54 |
| Barrel Length | 446.12 | 420.25 | 402.14 | 446.12 | 402.14 | 446.12 | 402.14 |
| Stop Surface Number | 24 | 24 | 24 | 24 | 24 | 24 | 24 |
| Distance to Stop | 0.00 | 0.00 | 0.00 | 0.00 | 0.00 | 0.00 | 0.00 |
| Stop Diameter | −11785.247 | −11532.072 | −11282.355 | −11783.909 | −11278.769 | −11786.057 | −11285.433 |
| Entrance Pupil Distance | 67.478 | 58.726 | 47.876 | 67.608 | 48.254 | 67.395 | 47.564 |
| Exit Pupil Distance | 32579. | 32579. | 32579. | 32579. | 32579. | 32579. | 32579. |

First Order Properties of Elements

| Element Number | Surface Numbers | | Power | f' |
|---|---|---|---|---|
| 1 | 1 | 2 | −0.85362E − 02 | −117.15 |
| 2 | 3 | 4 | −0.94733E − 02 | −105.56 |
| 3 | 4 | 5 | 0.81220E − 02 | 123.12 |
| 4 | 6 | 7 | 0.39684E − 02 | 251.99 |
| 5 | 8 | 9 | 0.39034E − 02 | 256.19 |
| 6 | 10 | 11 | −0.12467E − 01 | −80.209 |
| 7 | 11 | 12 | 0.58583E − 02 | 170.70 |
| 8 | 13 | 14 | 0.60639E − 02 | 164.91 |
| 9 | 15 | 16 | 0.69513E − 02 | 143.86 |
| 10 | 17 | 18 | −0.42708E − 02 | −234.15 |
| 11 | 19 | 20 | 0.15545E − 02 | 643.31 |

First–Order Properties of Doublets

| Element Numbers | | Surface Numbers | | Power | f' |
|---|---|---|---|---|---|
| 2 | 3 | 3 | 5 | −0.99328E − 03 | −1006.8 |
| 6 | 7 | 10 | 12 | −0.60688E − 02 | −164.78 |

First Order Properties of Groups

| Group Number | Surface Numbers | | Power | f' |
|---|---|---|---|---|
| 1 | 1 | 5 | −0.98030E − 02 | −102.01 |
| 2 | 6 | 7 | 0.39684E − 02 | 251.99 |
| 3 | 8 | 20 | 0.78383E − 02 | 127.58 |

First Order Properties of the Lens

| Zoom/Focus Position Number | Power | f' |
|---|---|---|
| 1 | 0.19555E − 01 | 51.139 |
| 2 | 0.16392E − 01 | 61.004 |
| 3 | 0.13657E − 01 | 73.225 |
| 4 | 0.19554E − 01 | 51.140 |
| 5 | 0.13680E − 01 | 73.099 |
| 6 | 0.19555E − 01 | 51.138 |
| 7 | 0.13637E − 01 | 73.328 |

TABLE 3

| Surf. No. | Type | Radius | Thickness | Glass | Clear Aperture Diameter |
|---|---|---|---|---|---|
| 1 | a | 302.1309 | 9.00000 | ACRYLIC | 104.09 |
| 2 | ac | 47.4329 | 78.37469 | | 81.77 |
| 3 | | −70.3606 | 4.10000 | FCD1 | 52.72 |
| 4 | | 272.0798 | 7.00000 | TAF3 | 52.85 |
| 5 | | −161.8160 | Space 1 | | 52.77 |

TABLE 3-continued

| | | | | |
|---|---|---|---|---|
| 6 | | 156.5210 | 8.14000 FD60 | 54.31 |
| 7 | | 730.4220 | Space 2 | 55.33 |
| 8 | | −1473.8400 | 9.00000 FCD1 | 66.20 |
| 9 | | −119.4897 | 13.46569 | 67.52 |
| 10 | | −78.2719 | 6.00000 FD5 | 69.04 |
| 11 | | 162.3287 | 13.50000 FCD1 | 77.92 |
| 12 | | −162.3287 | 0.10000 | 80.18 |
| 13 | | 137.3497 | 17.00000 FCD1 | 88.34 |
| 14 | | −175.1294 | 35.71132 | 89.01 |
| 15 | | 114.2469 | 19.00000 FCD1 | 88.81 |
| 16 | | −160.1066 | 0.78711 | 87.72 |
| 17 | | −221.1460 | 8.00000 FEL6 | 85.59 |
| 18 | | 221.1460 | 8.62819 | 80.38 |
| 19 | a | −1075.3290 | 9.00000 ACRYLIC | 79.76 |
| 20 | | −260.9656 | Space 3 | 79.58 |
| 21 | | ∞ | 17.00000 | 75.55 |
| 22 | | ∞ | 55.00000 BSC7 | 72.42 |
| 23 | | ∞ | 32580.94922 | 65.78 |
| 24 | | Aper. stop | −32580.94922 | 12031.11 |
| 25 | | ∞ | 0.00000 | 65.78 |
| 26 | | ∞ | 2.50000 BSC7 | 65.78 |
| 27 | | ∞ | Image distance | 65.48 |

Symbol Description
a - Polynomial asphere
c - Conic section

Even Polynomial Aspheres and Conic Constants

| Surf. No. | k | D | E | F | G | H | I |
|---|---|---|---|---|---|---|---|
| 1 | | −8.2781E − 08 | 4.5513E − 11 | 6.6948E − 15 | −9.6646E − 19 | −7.5403E − 22 | 1.1147E − 25 |
| 2 | −1.2000E + 00 | 4.5209E − 07 | 7.3282E − 11 | −1.1459E − 14 | 3.5740E − 17 | 1.0182E − 20 | −9.0498E − 24 |
| 19 | | −7.8117E − 07 | −3.8380E − 11 | −2.2648E − 14 | 8.6573E − 18 | 1.8343E − 21 | −1.6207E − 24 |

Variable Spaces

| Zoom/Focus Pos. | Space 1 T(5) | Space 2 T(7) | Space 3 T(20) | Focal Shift | Image Distance |
|---|---|---|---|---|---|
| 1 | 78.865 | 27.019 | 18.928 | −0.059 | 0.398 |
| 2 | 40.861 | 27.019 | 29.970 | −0.071 | 0.399 |
| 3 | 12.269 | 27.019 | 41.546 | −0.075 | 0.400 |
| 4 | 78.865 | 27.840 | 18.111 | −0.071 | 0.403 |
| 5 | 12.269 | 28.109 | 40.454 | −0.053 | 0.399 |
| 6 | 78.865 | 26.507 | 19.440 | −0.065 | 0.398 |
| 7 | 12.269 | 26.116 | 42.449 | −0.086 | 0.400 |

POS 1 System First Order Properties

OBJ. HT: −1500.0   f/ 2.81   MAG: −0.0220
STOP: 0.00 after surface 24. DIA: −11788.
EFL: 51.1920   FVD: 446.517   ENP: 67.4879
IMD: 0.398173   BRL: 446.119   EXP: 32579.3
OBD: −2259.34   OVL: 2705.86

POS 2 System First Order Properties

OBJ. HT: −1400.0   f/ 2.87   MAG: −0.0220
STOP: 0.00 after surface 24. DIA: −11534.
EFL: 60.9989   FVD: 419.557   ENP: 58.5814
IMD: 0.399452   BRL: 419.157   EXP: 32579.3
OBD: −2713.98   OVL: 3133.54

POS 3 System First Order Properties

OBJ. HT: −1400.0   f/ 2.93   MAG: −0.0220
STOP: 0.00 after surface 24. DIA: −11285.
EFL: 71.2712   FVD: 402.541   ENP: 49.2460
IMD: 0.400403   BRL: 402.140   EXP: 32579.3
OBD: −3190.20   OVL: 3592.74

POS 4 System First Order Properties

OBJ. HT: −4800.0   f/ 2.81   MAG: −0.0064
STOP: 0.00 after surface 24. DIA: −11787.
EFL: 51.2062   FVD: 446.525   ENP: 67.6122

TABLE 3-continued

| | | |
|---|---|---|
| IMD: 0.403203 | BRL: 446.122 | EXP: 32579.3 |
| OBD: −7933.27 | OVL: 8379.80 | |

POS 5 System First Order Properties

| | | |
|---|---|---|
| OBJ. HT: −4640.0 | f/ 2.93 MAG: | −0.0066 |
| STOP: 0.00 after surface 24. DIA: −11282. | | |
| EFL: 71.1979 | FVD: 402.538 | ENP: 49.5662 |
| IMD: 0.398532 | BRL: 402.139 | EXP: 32579.3 |
| OBD: −10737.8 | OVL: 11140.4 | |

POS 6 System First Order Properties

| | | |
|---|---|---|
| OBJ. HT: −960.00 | f/ 2.81 MAG: | −0.0321 |
| STOP: 0.00 after surface 24. DIA: −11789. | | |
| EFL: 51.1831 | FVD: 446.517 | ENP: 67.4104 |
| IMD: 0.397928 | BRL: 446.119 | EXP: 32579.3 |
| OBD: −1527.00 | OVL: 1973.52 | |

POS 7 System First Order Properties

| | | |
|---|---|---|
| OBJ. HT: −890.00 | f/ 2.93 MAG: | −0.0346 |
| STOP: 0.00 after surface 24. DIA: −11288. | | |
| EFL: 71.3321 | FVD: 402.541 | ENP: 48.9803 |
| IMD: 0.400167 | BRL: 402.140 | EXP: 32579.3 |
| OBD: −2012.48 | OVL: 2415.02 | |

First-Order Data

| Zoom/Focus Position | 1 | 2 | 3 | 4 | 5 | 6 | 7 |
|---|---|---|---|---|---|---|---|
| f/number | 2.81 | 2.87 | 2.93 | 2.81 | 2.93 | 2.81 | 2.93 |
| Magnification | −0.0220 | −0.0220 | −0.0220 | −0.0064 | −0.0066 | −0.0321 | −0.0346 |
| Object Height | −1500.0 | −1400.0 | −1400.0 | −4800.0 | −4640.0 | −960.00 | −890.00 |
| Object Distance | −2259.3 | −2714.1 | −3190.2 | −7933.3 | −10738. | −1527.0 | −2012.5 |
| Effective Focal Length | 51.192 | 60.999 | 71.271 | 51.206 | 71.198 | 51.183 | 71.332 |
| Image Distance | 0.39817 | 0.39945 | 0.40040 | 0.40320 | 0.39853 | 0.39793 | 0.40017 |
| Overall Length | 2705.9 | 3133.5 | 3592.7 | 8379.8 | 11140. | 1973.5 | 2415.0 |
| Forward Vertex Distance | 446.52 | 419.56 | 402.54 | 446.53 | 402.54 | 446.52 | 402.54 |
| Barrel Length | 446.12 | 419.16 | 402.14 | 446.12 | 402.14 | 446.12 | 402.14 |
| Stop Surface Number | 24 | 24 | 24 | 24 | 24 | 24 | 24 |
| Distance to Stop | 0.00 | 0.00 | 0.00 | 0.00 | 0.00 | 0.00 | 0.00 |
| Stop Diameter | −11787.868 | −11534.243 | −11285.378 | −11786.588 | −11282.079 | −11788.625 | −11288.220 |
| Entrance Pupil Distance | 67.488 | 58.581 | 49.246 | 67.612 | 49.566 | 67.410 | 48.980 |
| Exit Pupil Distance | 32579. | 32579. | 32579. | 32579. | 32579. | 32579. | 32579. |

First Order Properties of Elements

| Element Number | Surface Numbers | | Power | f' |
|---|---|---|---|---|
| 1 | 1 | 2 | −0.86732E − 02 | −115.30 |
| 2 | 3 | 4 | −0.89517E − 02 | −111.71 |
| 3 | 4 | 5 | 0.79087E − 02 | 126.44 |
| 4 | 6 | 7 | 0.41052E − 02 | 243.59 |
| 5 | 8 | 9 | 0.38418E − 02 | 260.30 |
| 6 | 10 | 11 | −0.12961E − 01 | −77.152 |
| 7 | 11 | 12 | 0.60563E − 02 | 165.12 |
| 8 | 13 | 14 | 0.63580E − 02 | 157.28 |
| 9 | 15 | 16 | 0.73039E − 02 | 136.91 |
| 10 | 17 | 18 | −0.48626E − 02 | −205.65 |
| 11 | 19 | 20 | 0.14382E − 02 | 695.33 |

First-Order Properties of Doublets

| Element Numbers | | Surface Numbers | | Power | f' |
|---|---|---|---|---|---|
| 2 | 3 | 3 | 5 | −0.71667E − 03 | −1395.3 |
| 6 | 7 | 10 | 12 | −0.63590E − 02 | −157.26 |

TABLE 3-continued

| | First Order Properties of Groups | | | |
|---|---|---|---|---|
| Group Number | Surface Numbers | | Power | f' |
| 1 | 1 | 5 | −0.95572E − 02 | −104.63 |
| 2 | 6 | 7 | 0.41052E − 02 | 243.59 |
| 3 | 8 | 20 | 0.76042E − 02 | 131.51 |

| First Order Properties of the Lens | | |
|---|---|---|
| Zoom/Focus Position Number | Power | f' |
| 1 | 0.19534E − 01 | 51.192 |
| 2 | 0.16394E − 01 | 60.999 |
| 3 | 0.14031E − 01 | 71.271 |
| 4 | 0.19529E − 01 | 51.206 |
| 5 | 0.14045E − 01 | 71.198 |
| 6 | 0.19538E − 01 | 51.183 |
| 7 | 0.14019E − 01 | 71.332 |

What is claimed is:

1. A zoom projection lens for forming an image of an object, said lens consisting in order from its image end to its object end of:

(A) a first lens unit having a negative power;

(B) a second lens unit having a positive power, said second lens unit being separated from the first lens unit by a first axial space which is varied during zooming;

(C) an aperture stop located between the first lens unit and the second lens unit; and (D) an optional field lens unit;

wherein:

(i) the second lens unit consists in order from its image end to its object end of:

(a) a first lens subunit having a positive power; and (b) a second lens subunit having a positive power, said second lens subunit being separated from the first lens subunit by a second axial space; and (ii) during focusing, the first lens subunit is moved to vary the second axial space.

2. The zoom projection lens of claim 1 wherein the first lens subunit has less lens elements than the first lens unit.

3. The zoom projection lens of claim 1 wherein the maximum clear aperture of the first lens subunit is smaller than the maximum clear aperture of the first lens unit.

4. The zoom projection lens of claim 1 wherein the vertex to vertex length of the first lens subunit is smaller than the vertex to vertex length of the first lens unit.

5. The zoom projection lens of claim 1 wherein the mass of the first lens subunit is less than the mass of the first lens unit.

6. The zoom projection lens of claim 1 wherein the first lens subunit has less lens elements than the second lens subunit.

7. The zoom projection lens of claim 1 wherein the first lens subunit is a singlet.

8. The zoom projection lens of claim 1 wherein the first lens subunit has less optical power than the second lens subunit.

9. A projection lens system for forming an image of an object, said system comprising:

(a) an illumination system comprising a light source and illumination optics which forms an image of the light source, said image of the light source being the output of the illumination system;

(b) a pixelized panel which comprises the object; and (c) the zoom projection lens of claim 1.

10. The projection lens system of claim 9 wherein said projection lens has an entrance pupil whose location substantially corresponds to the location of the output of the illumination system.

* * * * *